United States Patent
Yang et al.

(10) Patent No.: US 10,437,686 B2
(45) Date of Patent: Oct. 8, 2019

(54) FAILOVER SERVICE TO SUPPORT HIGH AVAILABILITY OF MONOLITHIC SOFTWARE APPLICATIONS

(71) Applicant: CA, Inc., New York, NY (US)

(72) Inventors: Yang Yang, Newton, MA (US); Patricia Ann Harasta, Westborough, MA (US)

(73) Assignee: CA, Inc., New York, NY (US)

( * ) Notice: Subject to any disclaimer, the term of this patent is extended or adjusted under 35 U.S.C. 154(b) by 183 days.

(21) Appl. No.: 15/720,691

(22) Filed: Sep. 29, 2017

(65) Prior Publication Data
US 2019/0102260 A1 Apr. 4, 2019

(51) Int. Cl.
| | | |
|---|---|---|
| G06F 11/00 | (2006.01) | |
| G06F 11/14 | (2006.01) | |
| H04L 12/24 | (2006.01) | |
| G06F 11/20 | (2006.01) | |
| G06F 9/50 | (2006.01) | |
| G06F 11/16 | (2006.01) | |

(52) U.S. Cl.
CPC ...... *G06F 11/1464* (2013.01); *G06F 11/1466* (2013.01); *G06F 11/1469* (2013.01); *G06F 11/2023* (2013.01); *H04L 41/0816* (2013.01); *G06F 9/5077* (2013.01); *G06F 11/1658* (2013.01); *G06F 11/2048* (2013.01)

(58) Field of Classification Search
CPC ............. G06F 11/1458; G06F 11/1464; G06F 11/1466; G06F 11/1469; G06F 11/2023; G06F 11/203; G06F 11/2043; G06F 11/2046
See application file for complete search history.

(56) References Cited

U.S. PATENT DOCUMENTS

| | | | | |
|---|---|---|---|---|
| 2011/0321041 A1* | 12/2011 | Bhat | ...................... | G06F 9/4856 718/1 |
| 2013/0179729 A1* | 7/2013 | Chiu | ....................... | G06F 12/16 714/19 |

OTHER PUBLICATIONS

Chapman, "Clustering stateful services for high availability with Consul", [online blog] retrieved on Aug. 17, 2017 from http://www.starkandwayne.com/blog/clustering-stateful-services-with-consul/, Jan. 10, 2017, 4 pages.

(Continued)

*Primary Examiner* — Michael Maskulinski
(74) *Attorney, Agent, or Firm* — Gilliam IP PLLC

(57) ABSTRACT

To eliminate additional development for monolithic applications, the high availability services are externalized from the application and performed by an agent executing alongside an application on a server or computing device. The agent is provided resources for verifying that an application is active and for controlling the application. The agent can use the provided resources to initialize a failover instance of the application as needed. Additionally, the agent can communicate and broadcast the status of its monitored application(s) to other agents through a shared database so that an agent on another server can initialize a failover instance of the application as needed. The agent can synchronize configuration files among the one or more instances of an application so that the application executes uniformly across all instances. The file synchronization is performed externally from the application and does not require additional development or modification of the existing monolithic application.

20 Claims, 8 Drawing Sheets

(56) References Cited

OTHER PUBLICATIONS

Docker, "High availability in Docker Swarm", Product manual retrieved on Aug. 17, 2017 from https://docs.docker.com/swarm/multi-manager-setup/, 3 pages.

* cited by examiner

FAILOVER SERVICE TO SUPPORT HIGH AVAILABILITY OF MONOLITHIC SOFTWARE APPLICATIONS

BACKGROUND

The disclosure generally relates to the field of data processing, and more particularly to software development, installation, and management.

High availability for a software application refers to an application's ability to tolerate failure and be almost continuously available. High availability can be accomplished by implementing data backup and failover logic into an application. Additionally, an application's architecture can be modular and allow for redundancy or parallel execution of application services so that if one service fails a similar service is already executing or may be quickly initialized. For example, distributed applications are developed and designed to run on multiple computers or servers within a network at the same time, and the application can be programmed to failover to another computer in the event of failure.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to providing file synchronization services for configuration files of monolithic applications in illustrative examples. Aspects of this disclosure can be also applied to synchronizing other files such as system files for an operating system on which the applications execute, performance metric data for the applications, event logs, etc. In other instances, well-known instruction instances, protocols, structures and techniques have not been shown in detail in order not to obfuscate the description.

Terminology

The description below also refers to "monolithic applications" to reference a single-tiered software application which is independent from other computing applications. The application may be a software program, a script, a process, a virtual machine, etc. Monolithic applications are often legacy applications which lack a modern software architecture design for distributed computing or modularity. The term "monolithic application" may also refer to a singleton service, which is a service that can only execute or be active on a single server or device at a time.

Overview

Due to their single-tiered, independent design, implementing high availability services for monolithic applications typically requires additional development or restructuring of the application. For example, additional development may be required to implement failover or file synchronization logic. To eliminate this developmental burden, the high availability services are externalized from the application and performed by an agent executing alongside an application on a server or computing device. The agent is provided resources for verifying that an application is active and for controlling the application, such as start, stop, and kill functionality. If the agent detects that the application has failed, the agent can use the provided resources to initialize a failover instance of the application. Additionally, the agent can communicate and broadcast the status of its monitored application(s) to other agents through a shared database. As a result, an agent on another server can initialize a failover instance of the application as needed (e.g. in the event of server or network failure). Furthermore, the agent can synchronize configuration files among the one or more instances of an application so that the application executes uniformly across all instances. Otherwise, failover instances of an application may not function according to previously defined configuration settings. Similar to the failover operations, the file synchronization is performed externally from the application and does not require additional development or modification of the existing monolithic application.

Figure 1:
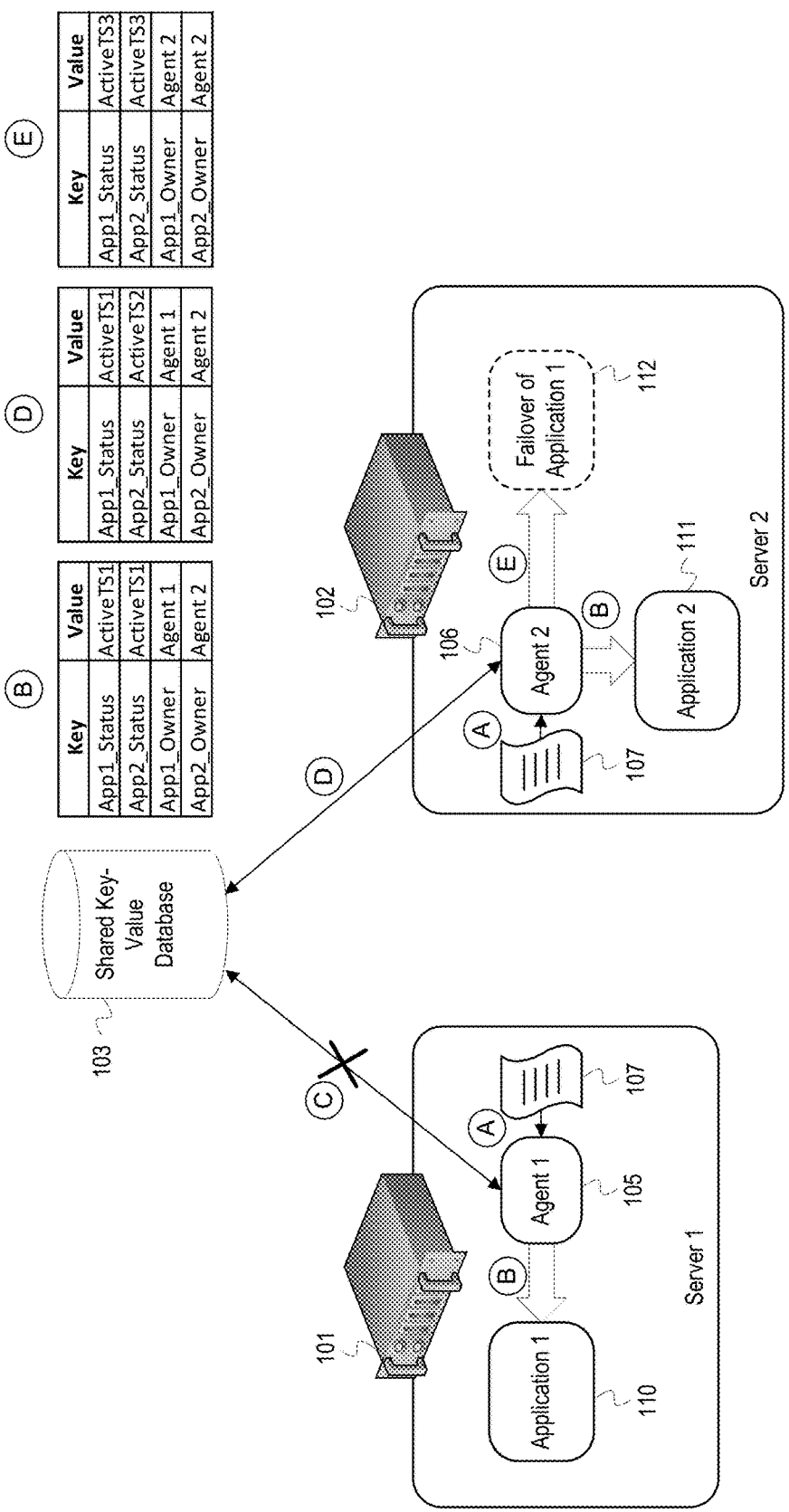
FIG. 1 depicts an example high availability system for monolithic applications.

Example Illustrations for High Availability Failover Service for Monolithic Applications FIG. 1 depicts an example high availability system with a failover service for monolithic applications. FIG. 1 depicts a server 1 101 that includes an agent 1 105 and a server 2 102 that includes an agent 2 106. The agent 1 105 monitors an application 1 110, and the agent 2 106 monitors an application 2 111. The server 1 101 and the server 2 102 are communicatively coupled to a shared key-value database 103 ("database 103"). The application 1 110 and the application 2 111 may be applications executing within virtual machines or applications that run natively on an operations system of the server 1 101 or the server 2 102.

At stage A, the agent 1 105 is configured with operating parameters 107 which defines settings and resources for monitoring the application 1 110. The operating parameters 107 identifies resources that the agent 1 105 can use to control the application 1 110 including starting, stopping, checking the status, and killing the application 1 110. The operating parameters 107 indicates protocols for communicating with the application 1 110 and locations of scripts to facilitate control of the application 1 110. For example, the operating parameters 107 may include a file path to a shell script which the agent 1 105 can execute to start the application 1 110. As an additional example, the operating parameters 107 can include an uniform resource locator (URL) for a REST service that allows the agent 1 105 to check the status of the application 1 110. If the application 1 110 does not have a service that indicates a status of the application 1 110, the operating parameters 107 can identify a script or some other resource that tests or verifies functionality of the application 1 110, such as a URL for loading a web page supplied by the application 1 110, executing a script that supplies test data to the application 1 110, etc. The operating parameters 107 may be defined within an extensible markup language (XML) file, a JavaScript Object Notation (JSON) object, etc. For example, the operating parameters 107 may be the following JSON object:

```
{
    "service": "Application 1",
    "type": "failover",
    "interval": "10s",
    "delay": "1m",
    "publish": "true",
    "control": {
        "start": "shell: /etc/init.d/App1 start",
        "stop": "shell: /etc/init.d/App1 stop",
        "status": "http: http://localhost:8581/rest",
        "kill": "groovy: /opt/tools/killApp1.groovy"
    }
}
```

The operating parameters 107 also define settings for the application 2 111 executing on the server 2 102. Each agent is configured with the operating parameters for applications executing within a cluster so that each agent can take control, execute, and monitor applications that may have failed on other servers. As a result, at stage A, the agent 2 106 is also configured with the operating parameters 107 which define settings for monitoring the application 2 111 and the application 1 110, even though the application 1 110 is not executing locally on the server 2 102 at the time of stage A.

At stage B, the agent 1 105 initializes and begins monitoring the application 1 110 and the agent 2 106 monitors the application 2 111. The agent 1 105 and the agent 2 106 monitor the applications in accordance with the settings defined in the operating parameters 107. The operating parameters indicate settings such as how frequently the agents are configured check the status or take a "heartbeat" of the monitored applications. As shown in the example JSON object above, the agent 1 105 may check the status of the application 1 110 on an "interval" of 10 seconds. As part of monitoring the applications, the agent 1 105 and the agent 2 106 update the status of their corresponding applications in the database 103. As shown in the database 103 values at stage B, the statuses for the application 1 110 and the application 1 110 are both listed as "Active." Additionally, each active status is tagged with a timestamp ("TS1") to indicate the last time at which the corresponding application was determined to be active. In some instances, the timestamp may not be stored as part of the value in the database 103 but may be indicated in metadata associated with the entry in the database 103. If the status of a monitored application has not changed, the monitoring agent can refresh the timestamp in the database 103 without having to also rewrite the status to the database 103. Furthermore, the database 103 indicates the "Owner" of each application. The owner of an application is the agent currently responsible for monitoring the corresponding application. At stage B, the owner of the application 1 110 is the agent 1 105 and the owner of the application 2 111 is the agent 2 106. As applications fail and failover occurs, the ownership of an application can change as described below.

At stage C, the server 1 101 has failed causing the application 1 110 and the agent 1 105 to stop functioning. Since the agent 1 105 stopped functioning, the agent 1 105 is unable to update the status of the application 1 110 in the database 103. In some instances, the application 1 110 may fail but the server 1 101 may remain operational. In such instances, the agent 1 105 can determine that the application 1 110 has failed and update the status of the application 1 110 to "Failed" in the database 103. Alternatively, the agent 1 105 may initialize another instance of the application 1 110 on the server 1 101 instead of updating the status in the database 103 to failed. In FIG. 1, however, since the server 1 101 has failed, the agent 1 105 is unable to update the status for the application 1 110, so the status remains the same as updated at stage B. In some instances, the agent 1 105 is unable to update the status due to a network outage between the server 1 101 and the database 103.

At stage D, the agent 2 106 retrieves the status of applications from the database 103. The agents are programmed to periodically retrieve the status of applications for which they have been configured from the database 103 to determine whether the applications executing within the server cluster are operational. The agent 2 106 retrieves the values from the database 103 at stage D and determines that the application 1 110 has failed. The agent 2 106 determines that the application 1 110 has failed based on the outdated timestamp associated with the application 1 110 status. The agent 2 106 can determine that the timestamp is outdated based on comparing the timestamp with previously retrieved statuses. Alternatively, since the agent 2 106 is also configured with the settings for the application 1 110, the agent 2 106 can determine the interval time for updating the status of the application 1 110 and determine whether the timestamp is older than the indicated interval. For example, the agent 2 106 may identify that the interval for the application 1 110 is 10 seconds and determine that the timestamp is expired based on the timestamp being older than 10 seconds.

At stage E, the agent 2 106 initializes a failover instance of the application 1 110 and begins monitoring the failover of application 1 112. Since the agent 2 106 is now monitoring the failover of application 1 112, the agent 2 106 updates the ownership of the "Application 1" in the database 103 to itself and updates the status of the failover of application 1 112.

After stage E, once the server 1 101 and the agent 1 105 have recovered, the agent 1 105 may regain control of the "Application 1." The agent 1 105 may again start the application 1 110 on the server 1 101 and update ownership of the "Application 1" in the database 103 to itself. When the agent 2 106 checks the statuses of the applications in the database 103, the agent 2 106 can detect that the timestamp for the status of the "Application 1" has been changed and then determine that the ownership for the "Application 1" has been changed. Based on detecting that it no longer owns the "Application 1," the agent 2 106 stops the failover of application 1 112 on the server 2 102.

In some implementations, the application 1 110 is also identified by an instance number or other variation of its name in the database 103. For example, the application 1 110 may be identified as "App1_Instance1" and the failover of application 1 112 may be identified as "App1_Instance2" in the database 103. When the agent 2 106 detects that the application 1 110 has failed, the agent 2 106 initializes the failover of application 1 112 and adds an entry to the database 103 for the status of the failover of application 1 112, which may be identified as a second instance of the "Application 1." The agent 2 106 continues to monitor the status of the failed application 1 110 in the database 103. Once the application 1 110 has recovered and its status updated in the database 103, the agent 2 106 can detect that the application 1 110 has recovered, kill the failover of application 1 112, and remove the status entry for the failover of application 1 112 from the database 103.

Figure 2:
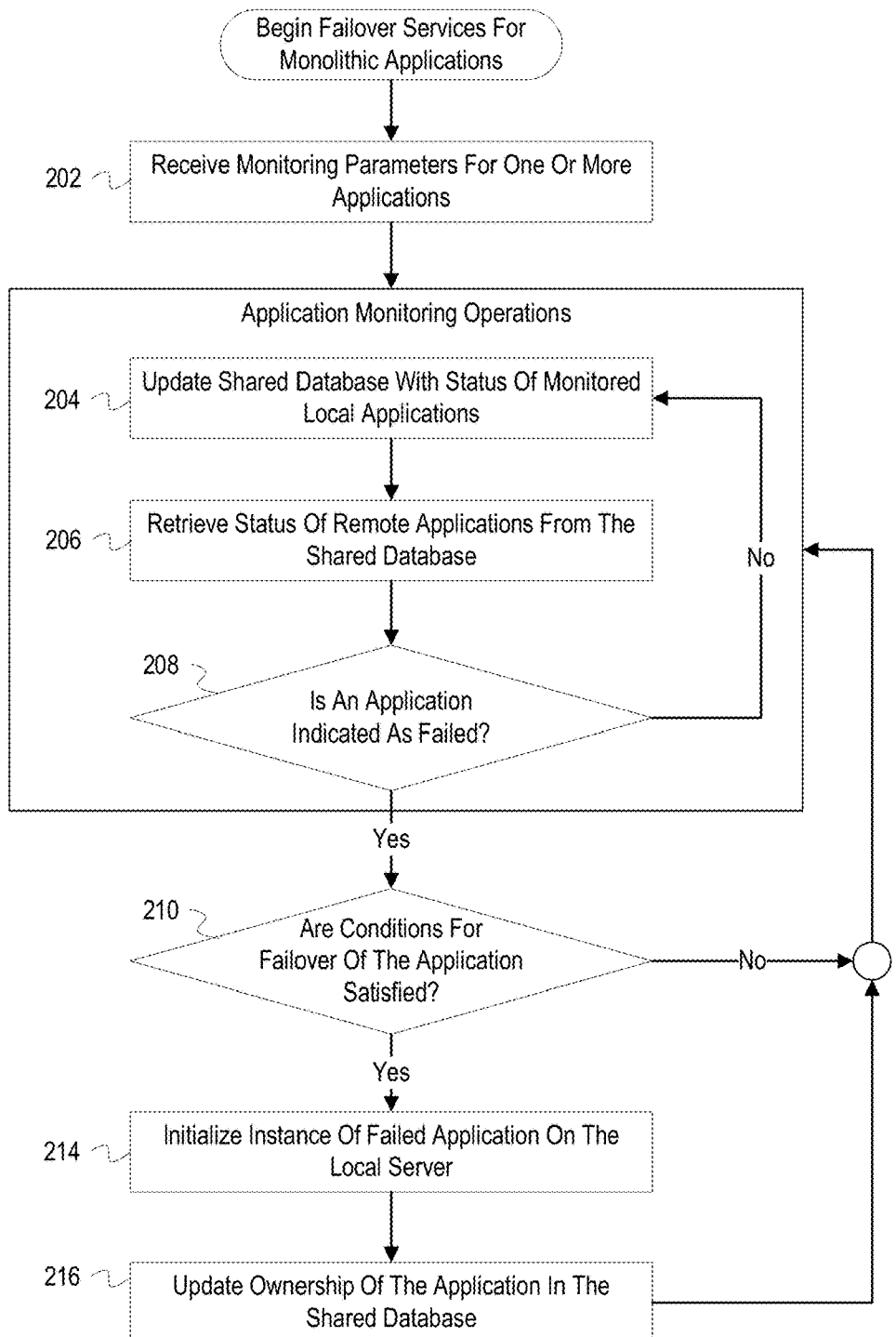
FIG. 2 depicts a flowchart with example operations for monitoring and providing failover services for a monolithic application.

FIG. 2 depicts a flowchart with example operations for monitoring and providing failover services for a monolithic application. FIG. 2 describes an agent as performing the operations of FIG. 2 for naming consistency with FIG. 1, although naming of program code can vary among implementations.

An agent receives monitoring parameters for one or more applications to be monitored (202). The monitoring parameters for an application include an identifier for the application, information for controlling the application, and monitoring settings, such as how frequently to update the status of the application and conditions for initiating or starting a failover instance of an application. The agent is configured to monitor applications executing on the same server or device as the agent. The agent, however, also receives monitoring parameters for applications executing on other devices. This is so that the agent can be prepared to monitor all applications which may eventually be executed locally on the server and monitored by the agent in the event of a failover.

Once configured the agent begins application monitoring operations depicted in FIG. 2 as operation blocks 204, 206, and 208. These operations are periodically performed by the agent. Although depicted in an order, the agent may perform the operations in different orders and at different times. For example, the agent may perform the operations of block 204 one or more times prior to performing the operations of blocks 206 and 208.

The agent updates a shared database with a status of monitored local applications (204). The agent checks the status of the applications which are executing on the same server as the agent. The agent checks the status using a resource identified by the monitoring parameters for each application. For example, the monitoring parameters may identify a script or REST service that can be utilized by the agent to determine whether an application is functional. The agent then stores or updates the status of the applications on a database that is shared by other agents monitoring applications on other servers. The shared database may be a key-value store, relational database, distributed database, etc. The database entry for an application status includes an indication of the application status (e.g. "Active" or "Inactive," a '1' for functional or a '0' for failed, etc.) and a timestamp for the status. The timestamp may be appended to the status value by the agent, or the timestamp may be indicated by a database manager service in metadata for the database entry.

The agent retrieves statuses of remote applications from the shared database (206). Although the agent is responsible for actively monitoring local applications, the agent also monitors the statuses of applications on other servers to determine whether any external applications have failed. Since the agent is configured with monitoring parameters for each application, the agent can use the other application identifiers to retrieve their statuses from the database. For example, if an application identifier is "App1," the agent may query the database for a key of a "App1_status" (or some other predefined key) to retrieve the status value. The agent may also retrieve all application statuses in the database with a query such as "*status." As described above, each status is associated with a timestamp. The agent also retrieves the timestamps when retrieving the application statuses.

The agent determines whether an application is indicated as failed (208). The agent can determine that an application has failed based on the status value indicated in the database or whether the timestamp associated with the status is expired. In some instances, the value of a status may indicate that an application has failed (e.g. "inactive," "failed"). However, if the application has failed due to server failure or a network outage, the agent responsible for monitoring the failed application may be unable to appropriately update the status of the application. In such instances, the agent uses the expired timestamp to determine that an application is not operational. The agent can compare the timestamp to a previously retrieved timestamp for the application status to determine whether the timestamp has been updated. Alternatively, the agent can identify the monitoring frequency in the monitoring parameters of the corresponding application and determine whether the status has been updated with the required frequency. If an application is not indicated as failed, the agent continues the application monitoring operations.

If an application is indicated as failed, the agent determines whether conditions for failover of the failed application have been satisfied (210). The monitoring parameters for an application can indicate conditions that control when or how a failover instance of an application should be initialized. The conditions are configurable on a per application basis and can be indicated in a same JSON or XML document as the monitoring parameters. The conditions may include a delay period, a resource requirement, or a condition based on the status of another service. The delay period may indicate, for example, that 1 minute should elapse to allow for recovery of the application prior to starting a failover instance of the application. Additionally, the delay period may be based on whether an agent is an owner of an application, i.e. whether the agent is currently responsible for monitoring the application. If the agent is not the owner of the application in the shared database, the specified delay period may be longer. After a delay period, the agent may again verify that the application has failed prior to initializing a failover application. The resource requirements may be used to restrict failover of an application to servers which can meet the hardware, software, or performance requirements for an application. For example, the resource requirements may include an amount of memory, processor load, available bandwidth, etc. Prior to instantiating a failover instance of the application, the agent determines whether the server on which it is executing satisfies the resource requirements. The conditions may also be reliant on whether another application or service has failed. For example, an application may have a separate service for handling some functionality of the application, so the failover of the application may be conditional on whether the separate service has also failed. The agent may wait until conditions have been satisfied. For example, the agent may wait until a delay period has elapsed. If the conditions have not been satisfied, the agent resumes the application monitoring operations.

If the conditions for failover of the application are satisfied, the agent initializes an instance of the failed application on its local server (214). The agent initializes the application using the resources identified in the monitoring parameters for the application. For example, the monitoring parameters may indicate the location of an executable version of the application that can be started by the agent. In some instances, the monitoring parameters identify a different version of an application to be instantiated in case of failover. For example, the monitoring parameters may identify a version of an application that permits read-only access to data, as opposed to full read/write access.

The agent updates ownership of the application in the shared database (216). Ownership of an application indicates which agent is currently responsible for monitoring the application. This allows other agents or services monitoring the applications to identify which agent is currently responsible for the application. After updating the ownership of the application, the agent resumes the application monitoring operations.

Figure 3:
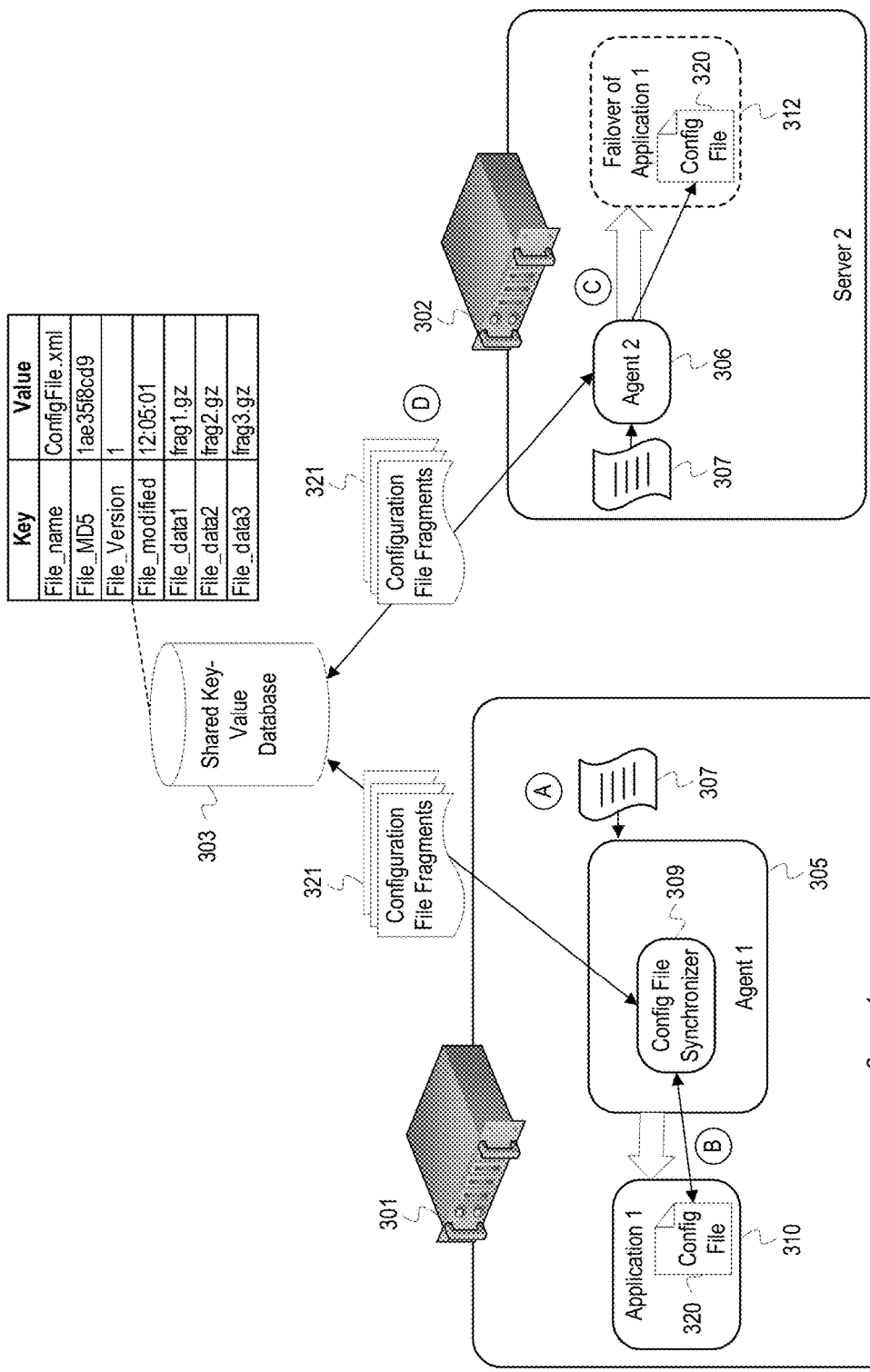
FIG. 3 depicts an example high availability system for monolithic applications which includes a file synchronization service for application configuration files.

Example Illustrations for High Availability File Synchronization Service for Monolithic Applications FIG. 3 depicts an example high availability system for monolithic applications which includes a file synchronization service for application configuration files. FIG. 3 depicts a server 1 301 that includes an agent 1 305 and a server 2 302 that includes an agent 2 306. The agent 1 305 monitors an application 1 310 and includes a configuration file synchronizer 309 ("synchronizer 309"). The server 1 301 and the server 2 302 are communicatively coupled to a shared key-value database 303 ("database 303").

At stage A, similar to the agents 105 and 106 in FIG. 1, the agent 1 305 and the agent 2 306 are configured with operating parameters 307 which define settings for monitoring the application 1 310. The operating parameters 307 also include information for synchronizing configuration files of the application 1 310 with the database 303. Multiple configuration files may be synchronized, but FIG. 3 depicts a single configuration file 320 to avoid obfuscating the illustration. The operating parameters 307 identify the location of the configuration file 320 and may specify other settings for synchronizing the file, such as a time interval for synchronizing the file, a fragment size, an encryption algorithm, a compression algorithm, etc. For example, the operating parameters 307 may be the following:

```
{
    "service": "Application 1",
    "path": "/opt/config/",
    "interval": "10s",
    "maxsize": "512KB"
    "filter": [
        "*.xml",
        "etc/*.properties"
    ]
}
```

The "maxsize" indicates a maximum size for an entry allowed by the database 303. This setting dictates the size of fragments that a file is divided into prior to storing the file in the database 303. The "filter" parameters indicate specific files to be synchronized (e.g., files with an ".xml" extension and files with a ".properties" extension in the "etc" directory) and may also indicate files that should not be synchronized.

At stage B, the synchronizer 309 retrieves and prepares the configuration file 320 for storage on the database 303. For an initial backup or synchronization of the configuration file 320, the synchronizer 309 generates a signature or fingerprint of the configuration file 320 using an algorithm such as the Secure Hash Algorithm (SHA) or a message digest algorithm like MD5. The synchronizer 309 also determines a modified time for the configuration file 320. A modified time refers to a time when the configuration file 320 was most recently changed or edited. As the application 1 310 operates, the application 1 310 may edit the file 320 whose modified time is then updated to reflect the time of the edit. A file system of a storage device used by the application 1 310 may maintain the modified time in metadata of the configuration file 320. This information is stored separately from the configuration file 320 in the database 303 so that they can be easily accessed on subsequent synchronization operations. The modified time and the signature for the configuration file 320 are also stored and maintained locally by the synchronizer 309 and are similarly used on subsequent synchronization operations to determine whether the configuration file 320 has been changed and requires re-synchronization. Subsequent synchronization operations performed by the synchronizer 309 are described in more detail in FIGS. 5, 6, and 7. The synchronizer 309 also separately stores metadata for the configuration file 320 in the database 303 to allow for quicker access. For example, the file version number may be used to resolve conflicts during synchronization.

The configuration file 320 is split into configuration file fragments 321 ("fragments 321") by the synchronizer 309 for storage in the database 303. The size of the fragments 321 is based on the maximum entry size allowed by the database 303. The synchronizer 309 stores each of the fragments 321 in entries in the database 303. In FIG. 3, the database 303 is a key-value store so each data fragment is assigned a key that indicates the file name and the ordering of the data fragment in the fragments 321. In some implementations, the configuration file 320 is compressed and encoded prior to being fragmented and stored in the database 303.

At stage C, the agent 2 306 detects that the application 1 310 has failed and initializes the failover of application 1 312. The agent 2 306 detects a failure of the application 1 310 and starts the failover of application 1 312 in a manner similar to that described in FIG. 1 at stage E.

At stage D, the agent 2 306 retrieves the fragments 321 from the database 303 to generate the configuration file 320 for the failover of application 1 312. The agent 2 306 reconstructs the fragments 321 into a file and decompresses or decodes the constructed file as necessary to generate the configuration file 320. The agent 2 306 then replaces a corresponding configuration file in the failover of application 1 312 with the configuration file 320 which reflects the most recent settings for the "Application 1." The agent 2 306 may replace the configuration file 320 prior to starting the failover of application 1 312 so that the failover of application 1 312 begins operating with the correct configuration settings. In some implementations, the agent 2 306 may have synchronized the configuration file 320 prior to stage C as part of routine file synchronization operations, described in more details in FIGS. 5, 6, and 7.

Figure 4:
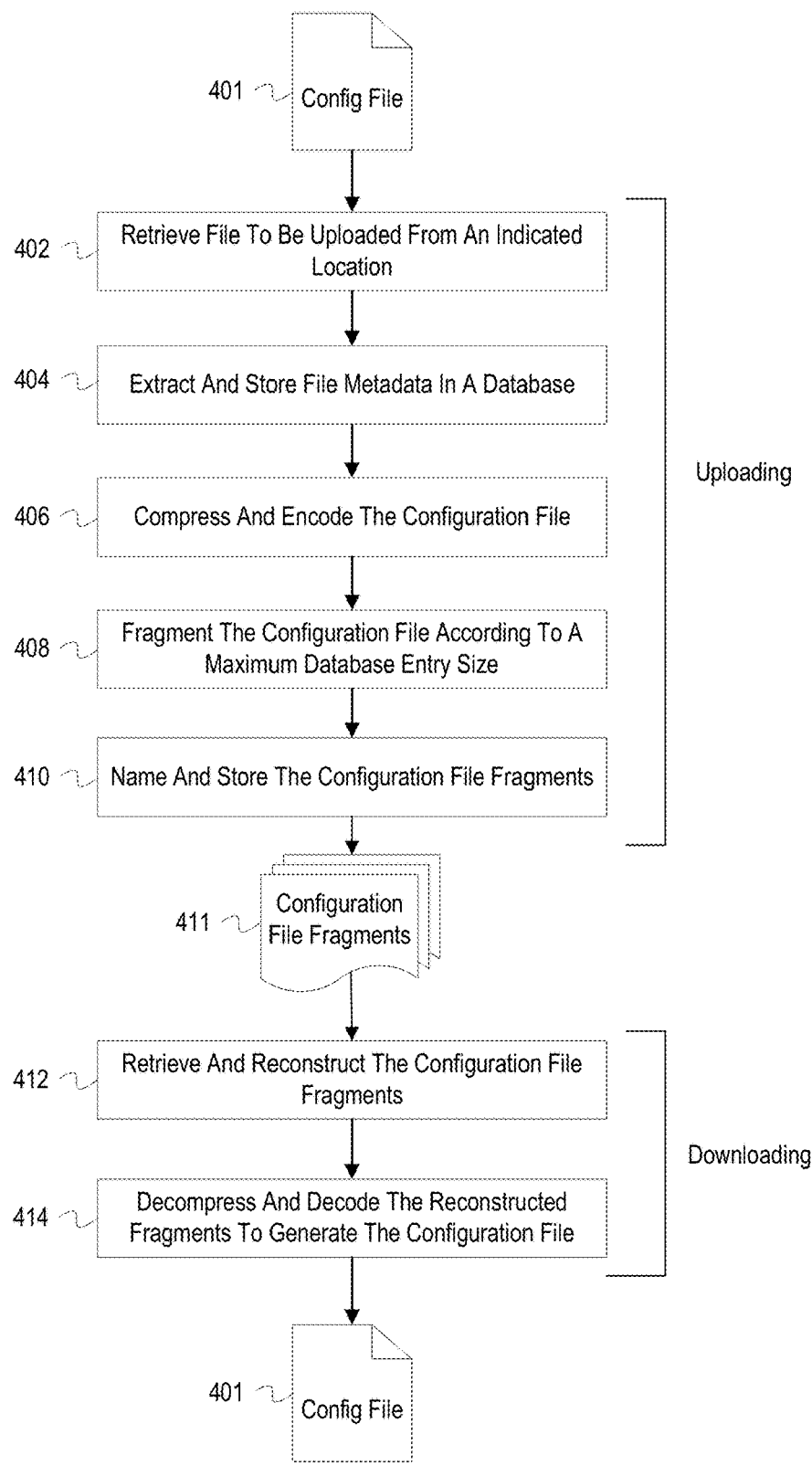
FIG. 4 depicts a flowchart with example operations for uploading and downloading a configuration file from a database.

FIG. 4 depicts a flowchart with example operations for uploading and downloading a configuration file from a database. FIG. 4 depicts a single configuration file 401 that is being uploaded and downloaded from a database. Multiple files can be uploaded or downloaded by repeating the operations for each file. The operations are described as being performed by an agent for naming consistency with FIG. 3, even though naming of program code can vary among implementations.

An agent retrieves a file 401 to be uploaded from an indicated location (402). The agent retrieves the file 401 from a location, such as a file path, indicated in monitoring parameters. The agent reads the file 401 from a location in storage into memory so that the agent can prepared the file for uploading without modifying the actual file 401 in storage.

The agent extracts and stores the file 401 metadata in a database (404). The agent extracts metadata from the file 401 such as a file name, modified time, version number, directory or file path, file type, etc. Since the file is later compressed and fragmented, the metadata is stored separately in the database so that the metadata can be retrieved without having to reconstruct the file 401. Additionally, if a signature of the file 401 was generated, the agent stores the signature along with the metadata.

The agent compresses and encodes the file 401 (406). The file 401 is compressed to reduce the size of the file 401 and may be encoded or encrypted to prevent unauthorized access to the file. The agent may compress the file 401 using various compression algorithms or archival file formats such as GNU zip, Roshal Archive (RAR), etc. The agent may encode the file 401 using various encryption algorithms such as RSA or AES.

The agent fragments the file 401 according to a maximum database entry size to generate fragments 411 (408). The database may have restrictions for the size of entries in the database. For example, key-value store databases frequently have limitations for entries of 512 kilobytes or 1 megabyte. As a result, the file 401 is sliced or split into fragments 411 that comply with the size restrictions. For example, if a database has a 1 megabyte entry restriction, a 10 megabyte file is split into 10 fragments. When the file 401 is compressed, the number of fragments 411 is based on the compressed size of the file 401.

The agent names and stores the fragments 411 in the database (410). The fragments are assigned database keys and named based their ordering. For example, the first fragment may have a name or key of "File01," the second fragment a name or key of "File02," etc. The fragments 411 are stored in the database in entries that correspond to the name or key of each fragment. For example, in a key-value database, the key "File01" would correspond to a database entry that has as its value the first fragment. The agent may also create another entry which indicates the total number of fragments 411.

To download the file 401, the agent retrieves and reconstructs the fragments 411 (412). The agent may retrieve the fragments by querying the database with the name of the file 401. For example, if the name of the file is "File," the agent queries the database with "File*" to retrieve the fragments "File01," File02," etc. The fragments 411 are reconstructed according to their order indicated by the fragment names or keys in the database.

The agent decompresses and decodes the reconstructed fragments 411 to generate the file 401 (414). The result of reconstructing the fragments 411 is the file 401 in its compressed or encoded form after the operations at block 406. After decompressing and decoding the reconstructed fragments 411, the agent is left with the file 401.

Figure 5:
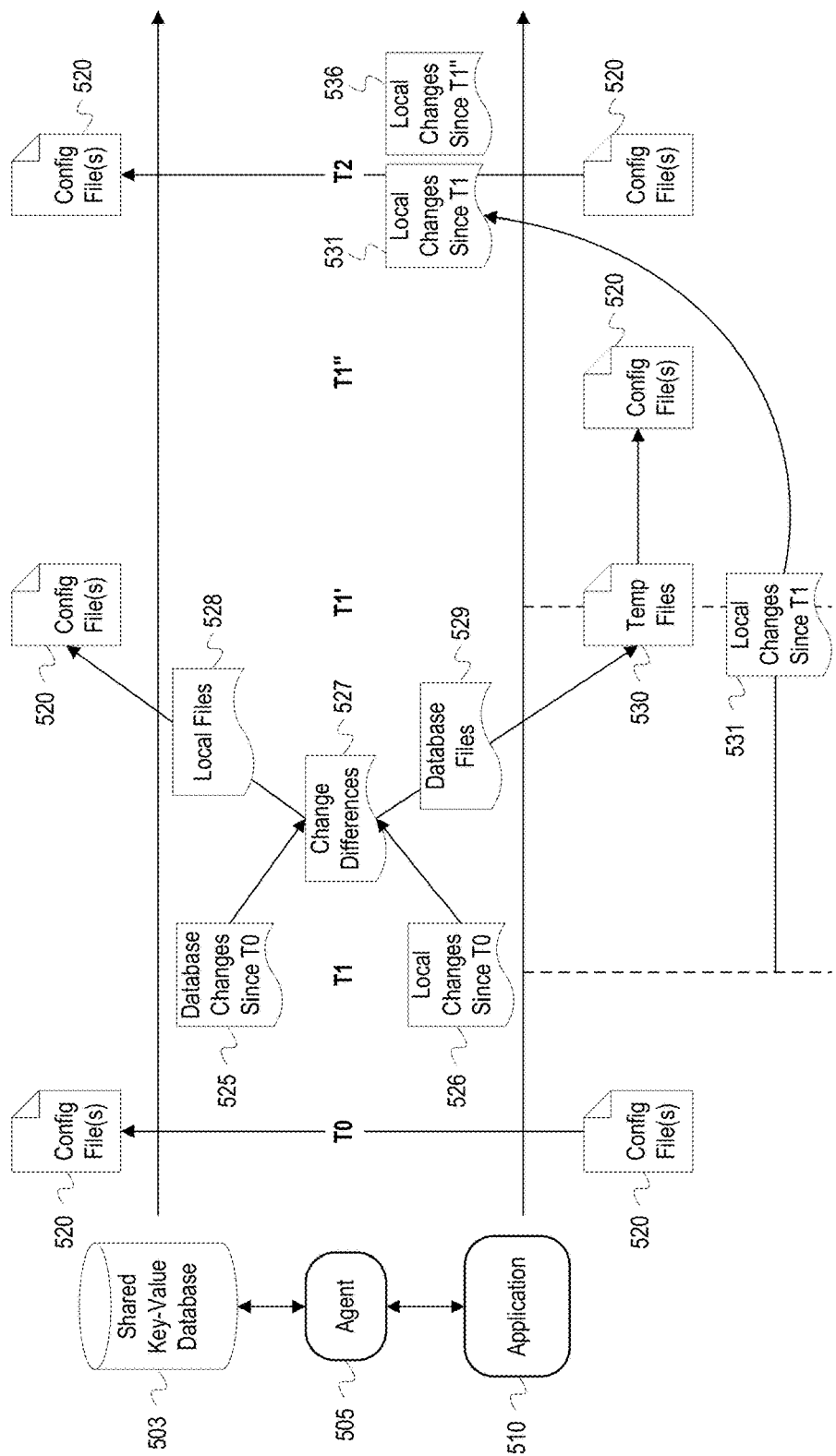
FIG. 5 depicts an example configuration file synchronization process.

FIG. 5 depicts an example configuration file synchronization process. FIG. 5 depicts an agent 505 which synchronizes configuration files 520 between an application 510 and a database 503. FIG. 5 depicts the file synchronization process at different times T0, T1, T1', T1", and T2.

At time T0, the agent 505 performs an initial synchronization of the files 520. An initial synchronization includes determining a most recent modified time and generating a signature for each of the files 520. The agent 505 maintains a record of the signatures and modified times locally. As described below, the agent 505 uses the modified times and the signatures at subsequent synchronization times to identify changes to any files in the files 520. The agent 505 also uploads the files 520, the signatures, and the modified times to the database 503 as described in FIG. 4.

After the operations at time T0, there are two versions of each file in the files 520: (1) a version that resides locally on a server of the application 510 and (2) a version stored in the database 503. Additionally, there are three versions or instances a modified time for each of the files 520: (1) a modified time for the local file being used by the application 510, (2) a modified time stored in the database 503 in association with the database 503 version of the file, and (3) a modified time recorded by the agent 505 at time T0, which is equal to the modified time of the local file at time T0. Similarly, there are three versions of a signature for each of the files 520: (1) a signature the can be generated from current data of the local file being used by the application 510, (2) a signature stored in the database 503 in association with the database 503 version of the file, and (3) a signature generated based on the local file at time T0 and recorded by the agent 505 at time T0. The modified times and signatures recorded by the agent 505 reflect the status of the local files 520 at each of the indicated times (T1, T1, T1', T1", and T2). These stored modified times and signatures are benchmarks by which updated modified times and signatures retrieved from the local version of the files 520 and the database 503 versions of the files are compared against.

In general, the agent 505 determines changes by first comparing retrieved modified times of the local files 520 and modified times retrieved from the database 503 to its own recorded modified times. If two modified times for a file are different, the agent 505 compares signatures for the file to verify that the file has indeed changed. The agent 505 starts with the modified times comparison, as opposed to a signature comparison, because the signature comparison is more computationally expensive than a comparison of modified times.

At time T1, the agent 505 identifies changes to the files 520 made locally by the application 510 since T0 526 and changes to the database 503 version of the files 520 since T0 525. The agent 505 and the application 510 both execute on a server (not depicted) which is referred to herein as comprising the "local" version of the files 520. The database 503 version of the files 520 is the version which is stored remotely on the database 503. The files 520 stored on the database 503 may be modified by other agents monitoring different instances of the application 510. For example, as depicted in FIG. 3, the agent 2 306 may synchronize changes to the configuration file 320 that occur while the failover of application 1 312 is operating. Additionally, multiple instances of the application 510 may be executing in parallel across different servers. The file synchronization process described herein may be used to keep the configuration files synchronized across each instance of the application 510.

To determine the local changes since T0 526, the agent 505 retrieves the modified time for each of the files 520 as stored locally by the application 510. The agent 505 then compares times to the times determined at time T0. If none of the times are different, the agent 505 determines that no changes have occurred locally. For each time that is different, the agent 505 generates a new signature for the file associated with the different modified time and compares the new signature to the signature determined at T0. If the signature comparison indicates changes to the file (i.e. the signatures are different), the agent 505 determines that the file has changed and marks the file as needing to be resynchronized. For example, the agent 505 may add the name of the file to a list of files to be synchronized.

To determine the database changes since T0 525, the agent 505 retrieves the modified time for each of the files 520 from the database 503 and compares the times to the modified times determined by the agent 505 at T0. If another agent synchronized a change to one or more of the files 520 in the database 503, the agent would have also updated the modified time for the file and the signature for the file in the database 503. If none of the times are different, the agent 505 determines that no changes occurred to the files 520 in the database 503. For each file with a different modified time, the agent 505 also retrieves the signature for the file from the database 503 and compares the signature with the signature generated at time T0. If the signatures are different, the agent 505 determines that the file has changed and marks the file as needing to be resynchronized.

The illustration in FIG. 5 assumes that changes have been made to the files 520 on both the database 503 and locally by the application 510. As a result, the differences in the changes 527 is also determined. In instances where there are only local changes, the agent 505 does not determine differences and uploads the changed files to replace the outdated files in the database 503. Similarly, in instances where there are only database changes, the agent 505 does not determine differences and downloads the changed files from the database 503 to replace the outdated files stored locally for the application 510.

To determine the change differences 527, the agent 505 compares the file names indicated in the database changes 525 to the file names in the local changes 526. If any of the names are the same, this indicates that the associated files have been changed both locally by the application 510 and in the database 503. If a file has been changed in both locations, the agent 505 compares the modified time from the local version and database 503 versions of the file and elects to synchronize the version which was more recently modified. In some implementations, the agent 505 may use other heuristics for determining which file to synchronize. For example, the agent 505 may always defer to a local version of a file or to a database version of a file. After determining the differences 527, the agent 505 has a list of local files 528 to be uploaded to the database 503 and a list of database files 529 to be downloaded for the application 510.

At time T1', the agent 505 uploads the local files 528 to the database 503 so that the database 503 has an updated and synchronized version of the files 520. The agent 505 also downloads the database files 529 and stores them as temporary files 530. The agent 505 stores the database 529 as temporary files 530 to avoid delay in downloading and writing files retrieved from the database 503 and so that additional changes to the files 520 since time T1 531 may be determined prior to merging the temporary files 530. During the synchronization process starting at T1, additional changes to the files 520 may have occurred. To capture these changes, the agent 505 performs a comparison of modified times and signatures at time T1' to those recorded at T1 to determine the local changes since T1 531. The local changes since T1 531 are carried over to the next synchronization time at T2. At time T2, the agent captures updated file modified times which are compared against the modified times captured at T1" after merging the temporary files 530 as described below. Since updated modified times are captured at T1", any changes between time T1 and T1' would not be reflected in the comparison so those changes would otherwise be lost.

At time T1", the agent 505 moves the temporary files 530 into the files 520 and captures new modified times and signatures for the files 520. Since the local version of the files 520 have now been updated with the temporary files 530, the new modified times and signatures are recorded so that the status of the files 520 at time T1" is accurately recorded and changes to the files 520 at the next synchronization time (e.g., time T2) can be determined.

At time T2, the agent 505 continues the synchronization process by again determining whether changes to the files 520 have been made. The agent 505 retrieves and compares the modified times of the files 520 to the modified times captured at T1" to determine the local changes since T1" 536. The agent 505 combines these changes with the local changes since T1 531 which were carried over from the changes determined at time T1'.

Figure 6:
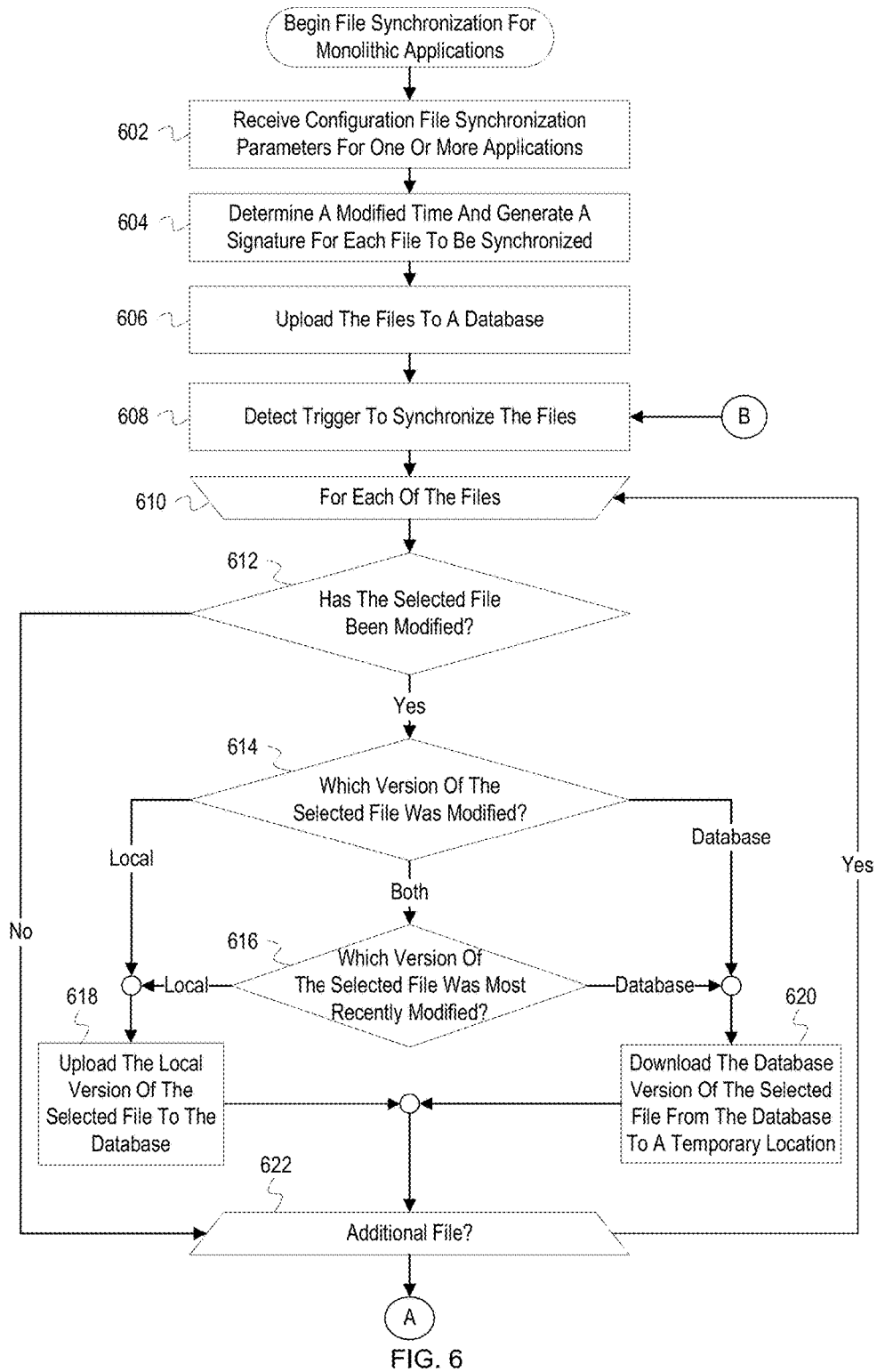
FIG. 6 depicts flowcharts with example operations for performing synchronization of configuration files.
Figure 7:
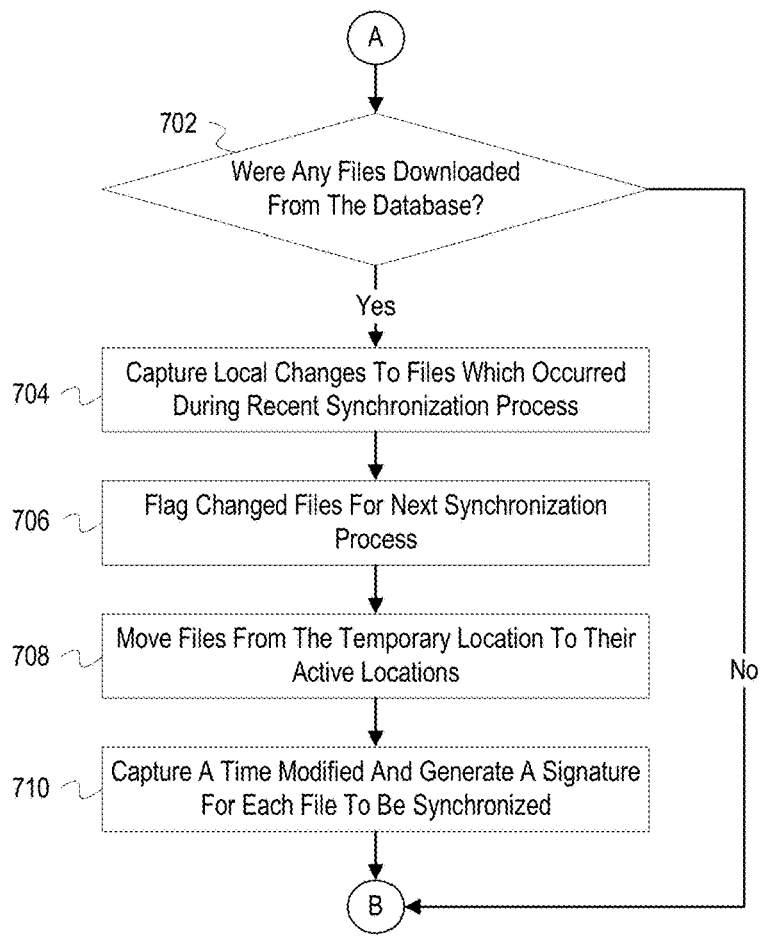
FIG. 7 depicts flowcharts with example operations for performing synchronization of configuration files.

FIGS. 6 and 7 depict flowcharts with example operations for performing synchronization of configuration files. FIGS. 6 and 7 describe an agent as performing the operations of FIGS. 6 and 7 for naming consistency with FIGS. 3 and 5, although naming of program code can vary among implementations.

An agent receives configuration file synchronization parameters for one or more applications (602). The file synchronization parameters identify the locations of files to be synchronized and may also indicate a synchronization interval, a maximum file size, a database entry size, an interval for performing a full synchronization, etc. The parameters may be indicated in an XML or JSON document. The agent analyzes the parameters and configures a file synchronization service to synchronize the files according to the indicated settings.

The agent determines a modified time and generates a signature for each file to be synchronized (604). The files to be synchronized may be located in storage of a server on which the agent is executing or may be located on an external storage device accessible by the server. The agent may determine a last modified time for each file from metadata of each file or in metadata maintained by a file system of a storage device. The agent also generates a signature or fingerprint for each file using an algorithm such as a hash algorithm like SHA or MD5. The agent stores the modified times and the signatures for use in subsequent synchronization operations to detect changes to the files.

The agent uploads the files to a database (606). The files are uploaded to the database as described in FIG. 4.

The agent detects a trigger to synchronize the files (608). The agent may be configured to synchronize the configuration files with the database at a periodic interval defined in the parameters. Additionally, the agent may actively monitor the files and synchronize them with the database as changes are detected locally.

The agent begins the synchronization process for each of the files (610). The agent iterates through each of the files to be synchronized. The file currently being processed is hereinafter referred to as "the selected file."

The agent determines whether the selected file has been modified (612). The agent retrieves a modified time for the selected file for the local version of the selected file and from the database. The retrieved times are compared to the modified time of the selected file previously recorded by the agent. If the modified time of the local version is different than the recorded time, the agent generates a new signature from the local version of the selected file and compares it to the signature previously recorded by the agent to ensure that the file has indeed changed. If the modified time of the database version is different than the recorded time, the agent retrieves the signature for the selected file from the database and compares it to the signature previously recorded by the agent to ensure that the file has indeed changed. If either signature is different than the previously recorded signature, the agent determines that the selected file has been modified.

If the file has been modified, the agent determines which version of the selected file was modified (614). If only the modified time of the local version is different, the agent determines that only the local version of the selected file should be synchronized. If only the modified time of the database version is different, the agent determines that only the database version of the selected file should be synchronized.

If both the local version and the database version of the selected file have been modified, the agent determines which version of the selected file was most recently modified (616). The agent compares the modified time for the selected file from the local version on the server and the modified time retrieved from the database. The agent then elects to synchronize the version of the file which was most recently modified. In some implementations, other election mechanisms are possible. For example, the agent may also pull a version number from the metadata of the selected file stored in the database and from the local version of the selected file. The agent then elects to synchronize the version of the file with the newest version number.

If only the local version of the file was modified or if the local version is elected to be synchronized, the agent uploads the local version of the selected file to the database (618). The selected file is uploaded to the database in a manner similar to that described in FIG. 4.

If only the database version of the file was modified or if the database version is elected to be synchronized, the agent downloads the database version of the selected file from the database to a temporary location (620). The temporary location may be a storage location assigned to the agent, or the agent may create a temporary directory on storage used by an application to which the selected file belongs.

If the selected file was not modified or after uploading or downloading an updated version of the selected file, the agent determines whether there is an additional file to be synchronized (622). The agent may scan directories or file locations indicated by the parameters to determine if there are any additional files to be synchronized.

As indicated by the letter A, the flowchart continues to FIG. 7. If there are no additional files, the agent determines whether any files were downloaded from the database to the temporary location (702). The agent may scan the temporary directory to determine whether any files are stored there, or the agent may consult a record or log indicating that files were downloaded from the database.

If files were downloaded from the database, the agent captures local changes to files which occurred during the recent synchronization process (704). The synchronization process of blocks 610-622 may take some time due to file processing, uploading, and downloading. During this time, the application(s) monitored by the agent may make changes to the files being synchronized. These changes may be lost unless the changes are captured prior to the merging of the downloaded files and the generation of new, benchmark modified times and signatures for the files. The agent captures changes by comparing a current modified time for each file to the modified time recorded by the agent during the previous synchronization operations. If any modified times are different, the agent also validates that the files have been modified by generating and comparing signatures for the modified files.

The agent flags changed files for next synchronization process (706). The agent may record the names of the files which have changed or otherwise mark the files for synchronization.

The agent moves the files from the temporary location into their active locations (708). The files are moved into the location as indicated by the file's metadata or the synchronization parameters to replace the outdated local versions of the files.

The agent captures a new modified time and generates signatures for each files to be synchronized (710). Since the local files have now been synchronized with the changed files on the database, the agent updates its record of modified times and signatures for each file. Otherwise, the agent might again determine during the next synchronization process that the updated files are still different from the database versions. As indicated by the letter B, after capturing the new modified times and signatures, the agent waits until another trigger for synchronizing the files is detected (608) before reperforming the synchronization process.

The operations depicted in FIG. 7 occur when files have been downloaded from the database. In instances where only local changes have occurred, the agent uploads the changed files to the database and waits until another synchronization trigger is detected (608).

In some implementations, the agent may periodically perform a full synchronization of the files to synchronize any changed files which may not have been detected. The agent may perform the full synchronization, for example, every fifth time the synchronization process is triggered, after a specified number of files have changed, or after a specified period of time has expired. During a full synchronization, the agent synchronizes files for which changes are detected in the manner described above, and additionally, the agent synchronizes local files for which changes have not been detected (i.e. the agent re-uploads the files to the database and updates signatures and modified times).

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted at blocks 408 and 410 of FIG. 4 can be performed in parallel or concurrently. Additionally, the operation depicted at block 210 of FIG. 2 may not be performed. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

FIGS. 1 and 3 are annotated with a series of letters A-E and A-D, respectively. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

Some operations above iterate through sets of files. In some implementations, these files may be iterated over according to an ordering of the files, an indication of file importance, etc. The number of iterations for loop operations may vary. Different techniques for analyzing the files may require fewer iterations or more iterations. For example, multiple files may be analyzed in parallel and some files may be excluded from analysis.

The examples often refer to an agent. The term agent is a construct used to refer to implementation of functionality for providing high availability failover and file synchronization services for monolithic applications. This construct is utilized since numerous implementations are possible. An agent may be a probe, service, manager, a particular component or components of a machine (e.g., a particular circuit card enclosed in a housing with other circuit cards/boards), machine-executable program or programs, firmware, a circuit card with circuitry configured and programmed with firmware for performing failover, synchronizing files, etc. The term is used to efficiently explain content of the disclosure. The agent can also be referred to as a probe or manager. Although the examples refer to operations being performed by an agent, different entities can perform different operations. For instance, a dedicated co-processor or application specific integrated circuit can manage file synchronization operations.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
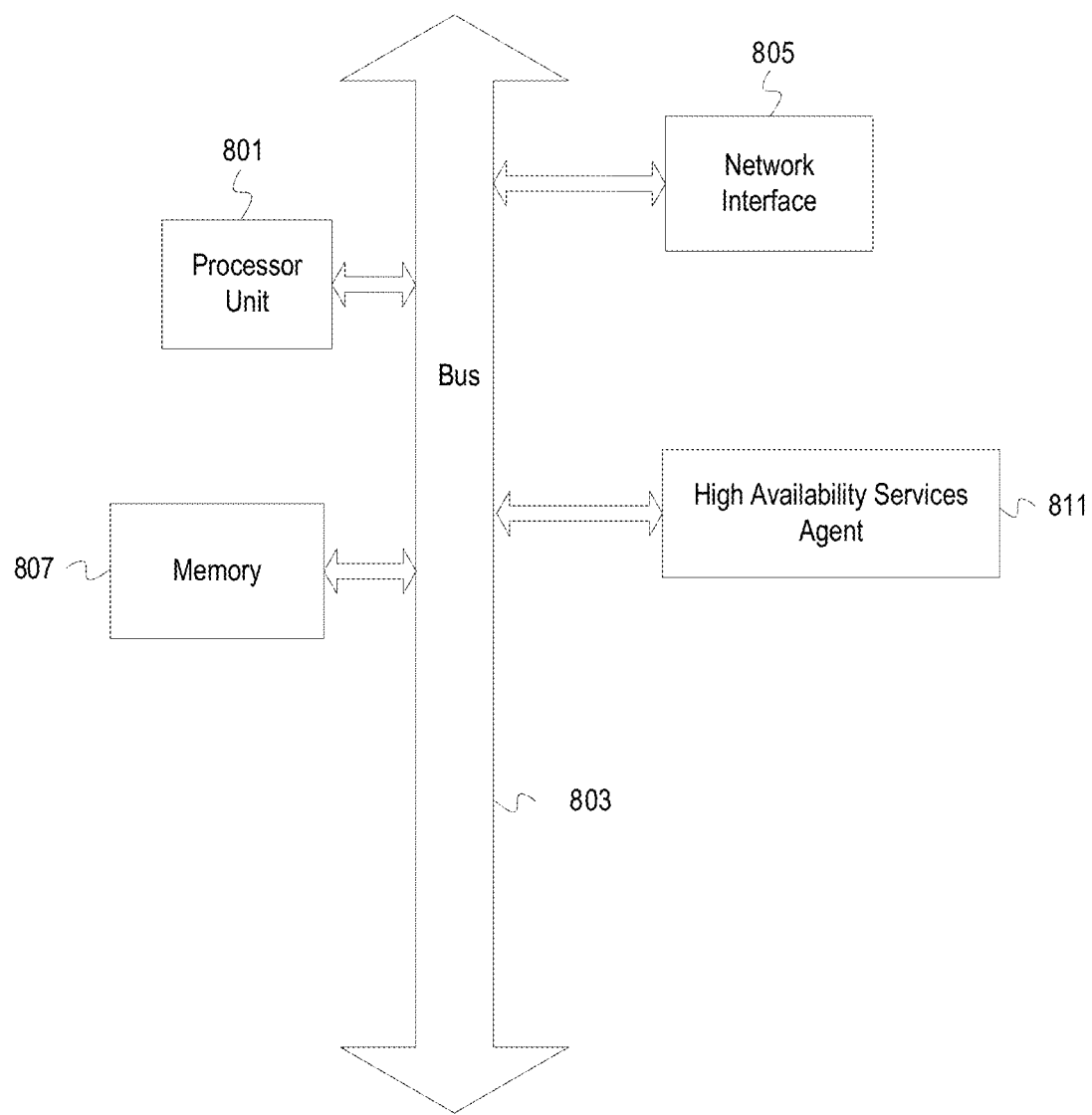
FIG. 8 depicts an example computer system with a high availability services agent.

FIG. 8 depicts an example computer system with a high availability services agent. The computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, Hyper-Transport® bus, InfiniBand® bus, NuBus, etc.) and a network interface 805 (e.g., a Fiber Channel interface, an Ethernet interface, an internet small computer system interface, SONET interface, wireless interface, etc.). The system also includes a high availability services agent 811. The high availability services agent 811 can be configured to provide failover and file synchronization services for identified monolithic applications. Any one of the previously described functionalities may be partially (or entirely) implemented in hardware and/or on the processor unit 801. For example, the functionality may be implemented with an application specific integrated circuit, in logic implemented in the processor unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801 and the network interface 805 are coupled to the bus 803. Although illustrated as being coupled to the bus 803, the memory 807 may be coupled to the processor unit 801.

While the aspects of the disclosure are described with reference to various implementations and exploitations, it will be understood that these aspects are illustrative and that the scope of the claims is not limited to them. In general, techniques for providing a failover and file synchronization service for high availability of monolithic applications as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
configuring a first agent with a first resource for determining a status of a first application executing on a first device, wherein the first agent executes independently of the first application on the first device;
determining, by the first agent, a first status of the first application based, at least in part, on the first resource;
storing, by the first agent, the first status and a first timestamp corresponding to the first status to a database;
retrieving, by a second agent, the first status and the first timestamp from the database, wherein the second agent executes on a second device;
determining, by the second agent, that the first application has failed based, at least in part, on the first status and the first timestamp; and
based on determining that the first application has failed, initializing, by the second agent, the first application on the second device, wherein the second agent was previously configured with a second resource for initializing the first application.

2. The method of claim 1 further comprising:
updating, by the second agent, a first entry in the database which indicates an agent currently monitoring the first application to reflect that the second agent is now monitoring the first application;
determining, by the second agent, a second status of the first application based, at least in part, on the first resource; and
storing, by the second agent, the second status and a second timestamp corresponding to the second status to the database.

3. The method of claim 2 further comprising:
detecting, by the second agent, that the first entry indicates that the first agent is now monitoring the first application; and
based on detecting that the first agent is now monitoring the first application, stopping execution of the first application on the second device.

4. The method of claim 1, wherein determining, by the second agent that the first application has failed based, at least in part, on the first status and the first timestamp comprises:
determining that the first status in the database has expired based, at least in part, on the first timestamp, wherein the second agent was previously configured with an expiration time interval associated with the first application.

5. The method of claim 1 further comprising configuring the first agent with parameters for monitoring a second application, wherein the second application is monitored by the second agent.

6. The method of claim 1 further comprising:
configuring the first agent and the second agent with identifiers for a plurality of applications comprising the first application; and
periodically retrieving, by the first agent and the second agent, statuses from the database for the plurality of applications.

7. The method of claim 1 further comprising, prior to initializing the first application on the second device, waiting, by the second agent, a period of time and determining whether the first application has recovered.

8. The method of claim 1 further comprising, prior to initializing the first application on the second device, determining, by the second agent, whether the second device satisfies performance requirements for executing the first application.

9. One or more non-transitory machine-readable media comprising program code for a first agent providing failover service for a first application, the program code to:
configure the first agent with a first resource for determining a status of the first application executing on a first device, wherein the first agent executes independently of the first application on the first device;
configure the first agent with an identifier and a second resource for initializing a second application executing on a second device;
determining a first status of the first application based, at least in part, on the first resource;
store the first status and a first timestamp corresponding to the first status to a database;
retrieve, using the identifier for the second application, a second status and a second timestamp from the database, wherein the second status and the second timestamp were stored on the database by a second agent executing on the second device;
determine that the second application has failed based, at least in part, on the second status and the second timestamp; and
based on determining that the second application has failed, initialize the second application on the first device using the second resource.

10. The machine-readable media of claim 9 further comprising program code to add a first entry with a third status to the database, wherein the third status indicates a status of the second application executing on the first device.

11. The machine-readable media of claim 10 further comprising program code to:
based on a determination that the second application has been restored on the second device,
stop execution of the second application on the first device; and
remove the first entry from the database.

12. The machine-readable media of claim 9, wherein the program code to determine that the second application has failed based, at least in part, on the second status and the second timestamp comprises program code to determine that the second status in the database has expired based, at least in part, on the second timestamp.

13. An apparatus comprising:
a processor; and
a machine-readable medium having program code executable by the processor to cause the apparatus to,
configure a first agent with a first resource for determining a status of a first application executing on a first device, wherein the first agent executes independently of the first application on the first device;

determine, by the first agent, a first status of the first application based, at least in part, on the first resource;

store, by the first agent, the first status and a first timestamp corresponding to the first status to a database;

retrieve, by a second agent, the first status and the first timestamp from the database, wherein the second agent executes on a second device;

determine, by the second agent, that the first application has failed based, at least in part, on the first status and the first timestamp; and based on a determination that the first application has failed, initialize, by the second agent, the first application on the second device, wherein the second agent was previously configured with a second resource for initializing the first application.

14. The apparatus of claim 13 further comprising program code executable by the processor to cause the apparatus to:

update, by the second agent, a first entry in the database which indicates an agent currently monitoring the first application to reflect that the second agent is now monitoring the first application;

determine, by the second agent, a second status of the first application based, at least in part, on the first resource; and store, by the second agent, the second status and a second timestamp corresponding to the second status to the database.

15. The apparatus of claim 14 further comprising program code executable by the processor to cause the apparatus to:

detect, by the second agent, that the first entry indicates that the first agent is now monitoring the first application; and based on detecting that the first agent is now monitoring the first application, stop execution of the first application on the second device.

16. The apparatus of claim 13, wherein the program code executable by the processor to cause the apparatus to determine, by the second agent that the first application has failed based, at least in part, on the first status and the first timestamp comprises program code executable by the processor to cause the apparatus to determine that the first status in the database has expired based, at least in part, on the first timestamp, wherein the second agent was previously configured with an expiration time interval associated with the first application.

17. The apparatus of claim 13 further comprising program code executable by the processor to cause the apparatus to configure the first agent with parameters for monitoring a second application, wherein the second application is monitored by the second agent.

18. The apparatus of claim 13 further comprising program code executable by the processor to cause the apparatus to:

configure the first agent and the second agent with identifiers for a plurality of applications comprising the first application; and periodically retrieve, by the first agent and the second agent, statuses from the database for the plurality of applications.

19. The apparatus of claim 13 further comprising program code executable by the processor to cause the apparatus to, prior to initializing the first application on the second device, wait, by the second agent, a period of time and determine whether the first application has recovered.

20. The apparatus of claim 13 further comprising program code executable by the processor to cause the apparatus to, prior to initializing the first application on the second device, determining, by the second agent, whether the second device satisfies performance requirements for executing the first application.

* * * * *